United States Patent
Papasakellariou et al.

(10) Patent No.: US 10,932,242 B2
(45) Date of Patent: *Feb. 23, 2021

(54) MULTIPLEXING LARGE PAYLOADS OF CONTROL INFORMATION FROM USER EQUIPMENTS

(71) Applicant: Samsung Electronics Co., Ltd., Gyeonggi-do (KR)

(72) Inventors: Aris Papasakellariou, Houston, TX (US); Young-Bum Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/428,070

(22) Filed: May 31, 2019

(65) Prior Publication Data

US 2019/0289593 A1    Sep. 19, 2019

Related U.S. Application Data

(63) Continuation of application No. 14/860,252, filed on Sep. 21, 2015, now Pat. No. 10,341,993, which is a
(Continued)

(51) Int. Cl.
*H04W 72/04* (2009.01)
*H04B 7/0417* (2017.01)
(Continued)

(52) U.S. Cl.
CPC ...... *H04W 72/0413* (2013.01); *H04B 7/0417* (2013.01); *H04L 1/0026* (2013.01);
(Continued)

(58) Field of Classification Search
CPC .......... H04W 72/0413; H04W 72/121; H04W 76/22; H04W 76/25; H04W 52/10;
(Continued)

(56) References Cited

U.S. PATENT DOCUMENTS 7,916,775 B2  3/2011  Kim et al.
7,978,623 B1  7/2011  Kotecha
(Continued)

FOREIGN PATENT DOCUMENTS

KR   10-2007-0119958    12/2007

OTHER PUBLICATIONS

U.S. Office Action dated Jan. 3, 2017 issued in counterpart U.S. Appl. No. 14/860,264, 13 pages.
(Continued)

*Primary Examiner* — Hanh N Nguyen
(74) *Attorney, Agent, or Firm* — The Farrell Law Firm, P.C.

(57) ABSTRACT

An apparatus and method are provided for transmitting Uplink Control Information (UCI) over a Physical Uplink Control CHannel (PUCCH) in a communication system. A method includes acquiring, by a user equipment (UE), from a base station, information for a PUCCH format, the information indicating one of a first PUCCH format associated with more than one resource block or a second PUCCH format associated with one resource block; generating, by the UE, UCI to be transmitted; modulating, by the UE, the UCI by using quadrature phase shift keying (QPSK); performing, by the UE, an inverse Fourier transform (IFT) operation on the modulated UCI; and transmitting, by the UE, the inverse Fourier transformed UCI using the PUCCH format based on the information for the PUCCH format.

20 Claims, 22 Drawing Sheets

Related U.S. Application Data continuation of application No. 14/084,083, filed on Nov. 19, 2013, now Pat. No. 9,144,063, which is a continuation of application No. 12/767,477, filed on Apr. 26, 2010, now Pat. No. 8,588,259.

(60) Provisional application No. 61/172,432, filed on Apr. 24, 2009.

(51) Int. Cl.

| | | |
|---|---|---|
| *H04L 1/00* | (2006.01) | |
| *H04L 1/16* | (2006.01) | |
| *H04L 5/00* | (2006.01) | |
| *H04W 72/12* | (2009.01) | |
| *H04L 27/20* | (2006.01) | |
| *H04B 7/06* | (2006.01) | |
| *H04L 1/18* | (2006.01) | |

(52) U.S. Cl.
CPC .......... *H04L 1/0028* (2013.01); *H04L 1/1664* (2013.01); *H04L 5/0053* (2013.01); *H04L 27/20* (2013.01); *H04W 72/121* (2013.01); *H04B 7/0626* (2013.01); *H04L 1/1812* (2013.01); *H04W 72/1278* (2013.01)

(58) Field of Classification Search
CPC . H04W 52/34; H04W 72/0406; H04W 72/08; H04W 72/12; H04L 1/0026; H04L 1/0028; H04L 1/1664; H04L 5/0055; H04L 5/0057
See application file for complete search history.

(56) References Cited

U.S. PATENT DOCUMENTS

| | | | |
|---|---|---|---|
| 7,979,075 B2 | 7/2011 | Cheng et al. | |
| 8,189,518 B2* | 5/2012 | Imamura | H04L 5/0055 370/329 |
| 8,259,602 B2* | 9/2012 | Kim | H04J 13/0074 370/252 |
| 8,265,016 B2 | 9/2012 | Xu | |
| 8,351,974 B2* | 1/2013 | Ahn | H04L 1/0061 455/522 |
| 8,588,259 B2 | 11/2013 | Papasakellariou et al. | |
| 8,630,184 B2 | 1/2014 | Kim et al. | |
| 8,767,632 B2 | 7/2014 | Ratasuk et al. | |
| 8,774,156 B2 | 7/2014 | Shen et al. | |
| 9,007,988 B2 | 4/2015 | Shen | |
| 9,144,063 B2* | 9/2015 | Papasakellariou | H04B 7/0417 |
| 9,220,020 B2 | 12/2015 | Okubo et al. | |
| 9,259,602 B2* | 2/2016 | Robinet | A62D 1/0071 |
| 9,319,195 B2* | 4/2016 | Cheng | H04L 1/0027 |
| 10,341,993 B2* | 7/2019 | Papasakellariou | |
| 2005/0232138 A1 | 10/2005 | Byun et al. | |
| 2006/0062217 A1 | 3/2006 | Kim et al. | |
| 2008/0095252 A1 | 4/2008 | Kim et al. | |
| 2008/0287155 A1 | 11/2008 | Xu et al. | |
| 2009/0168714 A1 | 7/2009 | Tanaka et al. | |
| 2010/0208629 A1 | 8/2010 | Ahn et al. | |
| 2010/0278109 A1 | 11/2010 | Papasakellariou et al. | |
| 2011/0032895 A1 | 2/2011 | Englund et al. | |
| 2016/0092342 A1 | 3/2016 | Inamdar et al. | |

OTHER PUBLICATIONS

U.S. Office Action dated May 12, 2017 issued in counterpart U.S. Appl. No. 14/860,331, 10 pages.
U.S. Office Action dated Sep. 13, 2017 issued in counterpart U.S. Appl. No. 14/860,319, 16 pages.
U.S. Office Action dated May 8, 2017 issued in counterpart U.S. Appl. No. 14/860,345, 9 pages.
U.S. Office Action dated Feb. 8, 2018 issued in counterpart U.S. Appl. No. 14/860,264, 12 pages.

* cited by examiner

MULTIPLEXING LARGE PAYLOADS OF CONTROL INFORMATION FROM USER EQUIPMENTS

PRIORITY

This application is a Continuation of U.S. application Ser. No. 14/860,252, which was filed in the U.S. Patent and Trademark Office (USPTO) on Sep. 21, 2015, which is a Continuation of U.S. application Ser. No. 14/084,083, which was filed in the USPTO on Nov. 19, 2013, and issued as U.S. Pat. No. 9,144,063 on Sep. 22, 2015, which is a Continuation of U.S. application Ser. No. 12/767,477, which was filed in the USPTO on Apr. 26, 2010, and issued as U.S. Pat. No. 8,588,259 on Nov. 19, 2013, and claims priority under 35 U.S.C. § 119(e) to U.S. Provisional Application No. 61/172,432, which was filed in the U.S. Patent and Trademark Office on Apr. 24, 2009, the entire content of each of which is incorporated herein by reference.

BACKGROUND OF THE INVENTION

1. Field of the Invention

The present invention is directed to wireless communication systems and, more particularly, to multiplexing transmissions conveying large payloads of control information from user equipments.

2. Description of the Related Art

A communication system consists of a DownLink (DL), supporting transmissions of signals from a base station (Node B) to User Equipments (UEs), and of an UpLink (UL), supporting transmissions of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

The DL signals consist of data signals, carrying the information content, control signals providing Downlink Control Information (DCI), and Reference Signals (RS) which are also known as pilots. The Node B transmits DCI through a Physical Downlink Control CHannel (PDCCH) and data information through a Physical Downlink Shared CHannel (PDSCH).

The UL signals consist of data signals, carrying the information content, control signals providing Uplink Control Information (UCI), and Reference Signals (RS). The UEs convey UL data signals through a Physical Uplink Shared CHannel (PUSCH). UCI signals include acknowledgement signals associated with the application of a Hybrid Automatic Repeat reQuest (HARQ) process, Service Request (SR) signals, Channel Quality Indicator (CQI) signals, Precoding Matrix Indicator (PMI) signals, and Rank Indicator (RI) signals. The combination of CQI, PMI, and RI will be referred to as Channel State Information (CSI). UCI can be transmitted in a Physical Uplink Control CHannel (PUCCH) or, together with data, in the PUSCH.

The CSI is used to inform the Node B of the channel conditions the UE experiences in the DL in order for the Node B to select the appropriate parameters, such as the Modulation and Coding Scheme (MCS), for the PDCCH or PDSCH transmission to the UE and ensure a desired BLock Error Rate (BLER) for the respective information. The CQI provides a measure of the Signal to Interference and Noise Ratio (SINR) over sub-bands or over the whole operating DL BandWidth (BW), typically in the form of the highest MCS for which a predetermined BLER target can be achieved for a signal transmission by the Node B in the respective BW. The PMI and RI are used to inform the Node B how to combine a signal transmission to the UE from multiple Node B antennas in accordance with the Multiple-Input Multiple-Output (MIMO) principle. Full channel state information in the form of channel coefficients allows the selection of the precoding weights with MIMO to closely match the channel experienced by the UE and offer improved DL performance at the expense of increased UL overhead required to feedback the channel coefficients relative to other CSI signal types.

An exemplary structure for the PUSCH transmission in the UL Transmission Time Interval (TTI), which for simplicity is assumed to consist of one sub-frame, is shown in FIG. 1. The sub-frame 110 includes two slots. Each slot 120 includes $N_{symb}^{UL}$ symbols used for the transmission of data signals, control signals, or RS. Each symbol 130 further includes a Cyclic Prefix (CP) to mitigate interference due to channel propagation effects. The PUSCH transmission in one slot may be located at the same or at a different part of the operating BW than the PUSCH transmission in the other slot. Some symbols in each slot can be used for RS transmission 140 to provide channel estimation and enable coherent demodulation of the received signal. The transmission BW is assumed to consist of frequency resource units which will be referred to as Physical Resource Blocks (PRBs). Each PRB is further assumed to consist of $N_{sc}^{RB}$ sub-carriers, or Resource Elements (REs), and a UE is allocated $M_{PUSCH}$ PRBs 150 for PUSCH transmission for a total of $M_{sc}^{PUSCH} = M_{PUSCH} \cdot N_{sc}^{RB}$ REs for the PUSCH transmission BW.

An exemplary UE transmitter block diagram for UCI and data transmission in the same PUSCH sub-frame is illustrated in FIG. 2. Coded CQI bits 205 and coded data bits 210 are multiplexed 220. If HARQ-ACK bits also need to be multiplexed, data bits are punctured to accommodate HARQ-ACK bits. Discrete Fourier Transform (DFT) of the combined data bits is performed in DFT unit 230. UCI bits are then obtained by performing sub-carrier mapping in sub-carrier mapping unit 240, wherein the REs corresponding to the assigned transmission BW are selected in control unit 250. Inverse Fast Fourier Transform (IFFT) is performed in the IFFT unit 260. Finally the CP is inserted in CP Insertion unit 270 and filtering is performed in Time Windowing unit 280, which outputs the transmitted signal 290. For brevity, additional transmitter circuitry such as digital-to-analog converter, analog filters, amplifiers, and transmitter antennas are not illustrated. Also, the encoding process for the data bits and the CSI bits, as well as the modulation process for all transmitted bits, are omitted for brevity. The PUSCH signal transmission is assumed to be over clusters of contiguous REs in accordance to the DFT Spread Orthogonal Frequency Multiple Access (DFT-S-OFDM) method allowing signal transmission over one cluster 295A (also known as Single-Carrier Frequency Division Multiple Access (SC-FDMA)), or over multiple non-contiguous clusters of contiguous BW 295B.

The Node B receiver performs the reverse (complementary) operations of the UE transmitter. This is conceptually illustrated in FIG. 3 where the reverse operations of those illustrated in FIG. 2 are performed. After an antenna receives the Radio-Frequency (RF) analog signal and after further processing units (such as filters, amplifiers, frequency down-converters, and analog-to-digital converters) which are not shown for brevity, the received signal 310 is filtered in Time Windowing unit 320 and the CP is removed in CP Removal unit 330. Subsequently, the Node B receiver applies a Fast Fourier Transform (FFT) in FFT unit 340, selects the REs used by the UE transmitter in Sub-Carrier Demapping unit 350, applies an Inverse DFT (IDFT) in IDFT unit 360, extracts the HARQ-ACK bits and places respective erasures for the data bits in Extraction unit 370, and de-multiplexes in Demultiplexer unit 380 the data bits 390 and CSI bits 395. As for the UE transmitter, well known Node B receiver functionalities such as channel estimation, demodulation, and decoding are not shown for brevity.

An exemplary structure for the CSI transmission in one slot of the PUCCH is illustrated in FIG. 4. A similar structure may also be used for the HARQ-ACK transmission in the PUCCH. The transmission in the other slot, which may be at a different part of the operating BW for frequency diversity, is assumed to effectively have the same structure. The CSI signal transmission in the PUCCH is assumed to be in one PRB. The CSI transmission structure 410 comprises the transmission of CSI signals and RS for enabling coherent demodulation of the CSI signals. The CQI bits 420 are modulated in modulators 430 with a "Constant Amplitude Zero Auto-Correlation (CAZAC)" sequence 440, for example with QPSK modulation, which is then transmitted after performing the IFFT operation as it is subsequently described. Each RS 450 is transmitted through the unmodulated CAZAC sequence.

An example of CAZAC sequences is given by Equation (1).

$$c_k(n) = \exp\left[\frac{j2\pi k}{L}\left(n + n\frac{n+1}{2}\right)\right] \quad (1)$$

In Equation (1), L is the length of the CAZAC sequence, n is the index of an element of the sequence n={0, 1, ..., L−1}, and k is the index of the sequence. If L is a prime integer, there are L−1 distinct sequences which are defined as k ranges in {0, 1, ..., L−1}. If the PRBs comprise of an even number of REs, such as for example $N_{sc}^{RB}=12$, CAZAC sequences with even length can be directly generated through computer search for sequences satisfying the CAZAC properties.

FIG. 5 shows an exemplary transmitter structure for a CAZAC sequence that can be used without modulation as RS or with modulation as CSI signal. The frequency-domain version of a computer generated CAZAC sequence, generated in CAZAC Sequence generator 510, is used. The REs corresponding to the assigned PUCCH BW are selected in Control unit 520 for mapping in Sub-Carrier Mapping unit 530 the CAZAC sequence. An IFFT is performed in IFFT unit 540, and a Cyclic Shift (CS), as it is subsequently described, is applied to the output in Cyclic Shift unit 550. Finally, the CP is inserted in CP Insertion unit 560 and filtering is performed in Time Windowing unit 570, which outputs transmitted signal 580. A UE is assumed to apply zero padding in REs used for signal transmission by other UEs and in guard REs (not shown). Moreover, for brevity, additional transmitter circuitry such as digital-to-analog converter, analog filters, amplifiers, and transmitter antennas as they are known in the art, are not shown.

The reverse (complementary) transmitter functions are performed for the reception of the CAZAC sequence. This is conceptually illustrated in FIG. 6 where the reverse operations of those in FIG. 5 apply. An antenna receives RF analog signal and after further processing units (such as filters, amplifiers, frequency down-converters, and analog-to-digital converters) the digital received signal 610 is filtered in Time Windowing unit 620 and the CP is removed in CP Removal unit 630. Subsequently, the CS is restored in the CS Restore unit 640, and a Fast Fourier Transform (FFT) is performed in FFT unit 650. The transmitted REs are selected in Sub-Carrier Demapping unit 660 under control of Control unit 665. FIG. 6 also shows the subsequent correlation in Multiplier 670 with the replica of the CAZAC sequence produced in CAZAC Based Sequence unit 680. Finally, the output 690 is obtained which can then be passed to a channel estimation unit, such as a time-frequency interpolator, in case of a RS, or can to detect the transmitted information, in case the CAZAC sequence is modulated by CSI information bits.

Different CSs of the same CAZAC sequence provide orthogonal CAZAC sequences. Therefore, different CSs of the same CAZAC sequence can be allocated to different UEs in the same PRB for their RS or CSI transmission and achieve orthogonal UE multiplexing. This principle is illustrated in FIG. 7. In order for the multiple CAZAC sequences 710, 730, 750, 770 generated respectively from multiple CSs 720, 740, 760, 780 of the same root CAZAC sequence to be orthogonal, the CS value 790 should exceed the channel propagation delay spread DELTA (including a time uncertainty error and filter spillover effects). If $T_S$ is the DFT-S-OFDM symbol duration, the number of such CSs is equal to the mathematical floor of the ratio $T_S/D$.

For the CSI transmission structure in the PUCCH sub-frame, as illustrated in FIG. 4, for one of the two sub-frame slots, 5 symbols carry CSI and 2 symbols carry RS. As the CSI transmission needs to be relatively reliable and cannot utilize HARQ retransmissions, it needs to be protected through reliable channel coding. As a result, the CSI payload supported in the PUCCH is small. For example, puncturing a (32, 10) Reed-Mueller (RM) code to (20, 10), 10 CSI bits can be transmitted using QPSK modulation and coding rate of 1/2 (20 coded bits).

In order to support higher data rates than possible in legacy communication systems, aggregation of multiple Component Carriers (CCs) can be used in both the DL and the UL to provide higher operating BWs. For example, to support communication over 100 MHz, aggregation of five 20 MHz CCs can be used. UEs capable of operating only over a single DL/UL CC pair will be referred to as "Legacy-UEs (L-UEs)" while UEs capable of operating over multiple DL/UL CCs will be referred to as "Advanced-UEs (A-UEs)". The invention assumes that if an A-UE receives PDSCH in multiple DL CCs or transmits PUSCH in multiple UL CCs, a different data packet having its own HARQ process is conveyed by each such PDSCH or PUSCH transmission.

FIG. 8 further illustrates the principle of CC aggregation. An operating DL BW of 100 MHz 810 is constructed by the aggregation of 5 (contiguous, for simplicity) DL CCs, 821, 822, 823, 824, 825, each having a BW of 20 MHz. Similarly, an operating UL BW of 100 MHz 820 is constructed by the aggregation of 5 UL CCs, 831, 832, 833, 834, 835, each having a BW of 20 MHz. Each DL CC is assumed to be uniquely mapped to a UL CC (symmetric CC aggregation) but it is also possible for more than 1 DL CC to be mapped to a single UL CC or for more than 1 UL CC to be mapped to a single DL CC (asymmetric CC aggregation, not shown for brevity). The link between DL CCs and UL CCs can be UE-specific.

To improve cell coverage and increase cell-edge data rates in the DL, Coordinated Multiple Point (CoMP) transmission/reception through Joint Processing (JP) can be used where multiple Node Bs transmit the same data signal to a UE. The DL CoMP principle is illustrated in FIG. 9 wherein two Node Bs, Node B1 910 and Node B2 920, transmit a first data signal to UE1 930 and a second data signal to UE2 940. The Node Bs share the information content for a UE operating in DL CoMP mode through backhaul which is typically referred to as X2 interface 950. The backhaul, for example, may be a fiber optic link or a microwave link.

To support PDSCH reception by an A-UE over multiple DL CCs, the A-UE should be able to transmit substantially larger CSI or HARQ-ACK information payloads to the Node B than an L-UE having PDSCH reception only in a single DL CC. While for symmetric DL/UL CC aggregations UCI transmission may fundamentally appear just as a parallelization of the one for single DL/UL CC pair to multiple DL/UL CC pairs, it is instead preferable for a UE to transmit all UCI in only one UL CC. This allows addressing all possible UE-specific symmetric or asymmetric DL/UL CC aggregations with a single design. It also avoids Transmission Power Control (TPC) problems that may occur if the UE simultaneously transmits UCI signals with substantially different powers in different UL CCs. Therefore, it is advantageous to consider UCI signaling structures where the transmission is in a single UL CC. This further necessitates the transmission of larger UCI payloads, than legacy ones, in a single channel.

DL CoMP also represents a challenging scenario with respect to required payloads of CSI feedback signaling. Even for the benign case of CQI-only feedback, the respective payload increases proportionally with the number of Node Bs in the CoMP CSI reporting set. For example, for 3 Node Bs in the CoMP CSI reporting set, the total CSI payload is bits and cannot be supported by the PUCCH structure in FIG. 4. Since a CoMP UE is often likely to also experience low UL SINR, supporting higher CSI payloads becomes even more challenging. The combination of CoMP and multiple DL CCs further increases the required CSI payloads.

The PUSCH can support substantially larger payloads than the PUCCH and can accommodate the increased UCI payloads. However, as the minimum PUSCH granularity is 1 PRB, the UL overhead from using conventional PUSCH to support only UCI transmissions can become substantial even when this is done for a few UEs per sub-frame.

Therefore, there is a need to design PUCCH structures supporting large payloads for UCI signaling in a communication system supporting DL CC aggregation or DL CoMP.

There is another need to minimize the UL overhead corresponding to the transmission of large UCI payloads.

Finally, there is a need to efficiently manage the PUCCH and PUSCH resources while supporting the transmission of large UCI payloads.

SUMMARY OF THE INVENTION

Accordingly, the present invention has been designed to solve at least the aforementioned limitations and problems in the prior art and provide at the advantages described below.

Aspects of the present invention are to provide methods and apparatus for using different channel structures for the transmission of Uplink Control Information (UCI) according to the UCI payload, for multiplexing UCI transmissions from User Equipments (UEs) in the selected channel structure, and for managing the resources associated with UCI transmissions from different UEs.

In accordance with aspect of the present invention, a method is provided for transmitting uplink control information (UCI) over a physical uplink control channel (PUCCH) in a communication system. The method includes acquiring, by a user equipment (UE), from a base station, information for a PUCCH format, the information indicating one of a first PUCCH format associated with more than one resource block or a second PUCCH format associated with one resource block; generating, by the UE, UCI to be transmitted; modulating, by the UE, the UCI by using quadrature phase shift keying (QPSK); performing, by the UE, an inverse Fourier transform (IFT) operation on the modulated UCI; and transmitting, by the UE, the inverse Fourier transformed UCI using the PUCCH format based on the information for the PUCCH format.

In accordance with another aspect of the present invention, a method is provided for acquiring UCI over a PUCCH in a communication system. The method includes transmitting, by a base station, to a user equipment (UE), information for a PUCCH format, the information indication one of a first PUCCH format associated with more than one resource block or a second PUCCH format associated with one resource block; receiving, by the base station, from the UE, an uplink signal using the PUCCH format based on the information for the PUCCH format; performing, by the base station, a Fourier transform (FT) operation on the received uplink signal; demodulating, by the base station, the Fourier transformed uplink signal by using quadrature phase shift keying (QPSK); and acquiring, by the base station, UCI from the demodulated uplink signal.

In accordance with another aspect of the present invention, an apparatus is provided for transmitting UCI over a PUCCH in a communication system. The apparatus includes a transceiver configured to transmit, to a user equipment (UE), information for a PUCCH, the information indicating one of a first PUCCH format associated with more than one resource block or a second PUCCH format associated with one resource block, and receive, from the UE, an uplink signal using the PUCCH format based on the information for the PUCCH format; and a controller configured to perform a Fourier transform (FT) operation on the received uplink signal, demodulate the Fourier transformed uplink signal by using quadrature phase shift keying (QPSK), and acquiring UCI from the demodulated uplink signal.

In accordance with another aspect of the present invention, a base station is provided for receiving UCI over a PUCCH in a communication system. The base station includes a transceiver configured to transmit, to a user equipment (UE), information for a PUCCH, the information indicating one of a first PUCCH format associated with more than one resource block or a second PUCCH format associated with one resource block, and receive, from the UE, an uplink signal using the PUCCH format based on the information for the PUCCH format; and a controller configured to perform a Fourier transform (FT) operation on the received uplink signal, demodulate the Fourier transformed uplink signal by using quadrature phase shift keying (QPSK), and acquiring UCI from the demodulated uplink signal.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EMBODIMENTS OF THE INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM in particular.

In order to support larger UCI payloads than in a legacy system operating with single DL/UL CCs and without DL CoMP, the supportable UCI payload sizes need to be expanded. The first object of the present invention considers the definition of a PUCCH format using the PUSCH transmission structure. The embodiment considers the CSI transmission.

Figure 10:
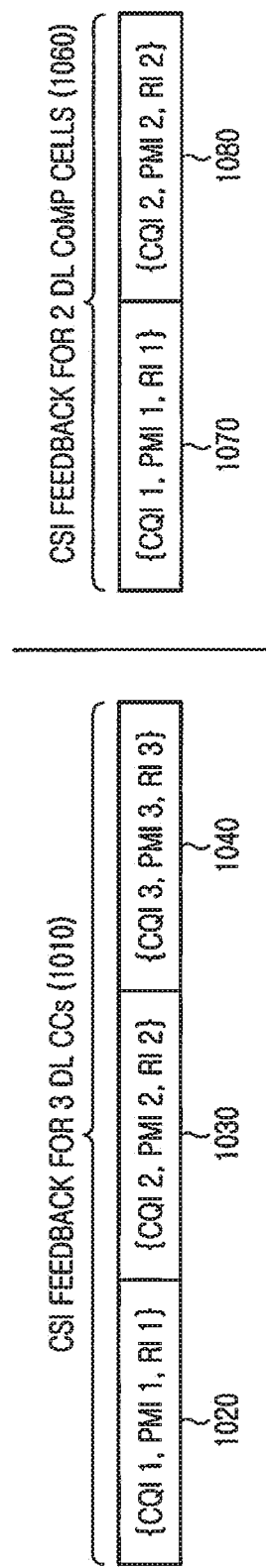
FIG. 10 is a diagram illustrating exemplary CSI contents for 3 Downlink Component Carriers.

FIG. 10 illustrates CSI content for 3 DL CCs 1010 consisting of {CQI 1, PMI 1, RI 1} 1020, {CQI 2, PMI 2, RI 2} 1030, and {CQI 3, PMI 3, RI 3} 1040, and of the CSI for 2 DL CoMP cells 1060 consisting of {CQI 1, PMI 1, RI 1} 1070, {CQI 2, PMI 2, RI 2} 1080. For the purposes of FIG. 10, a DL CC can be viewed as a DL CoMP cell and the reverse. Not all of the {CQI, PMI, RI} need to be included in the CSI. For example, the CSI for the first DL CC 1020 may consist of only CQI while the CSI for the second DL CC 1030 may consist of only RI.

Figure 4:
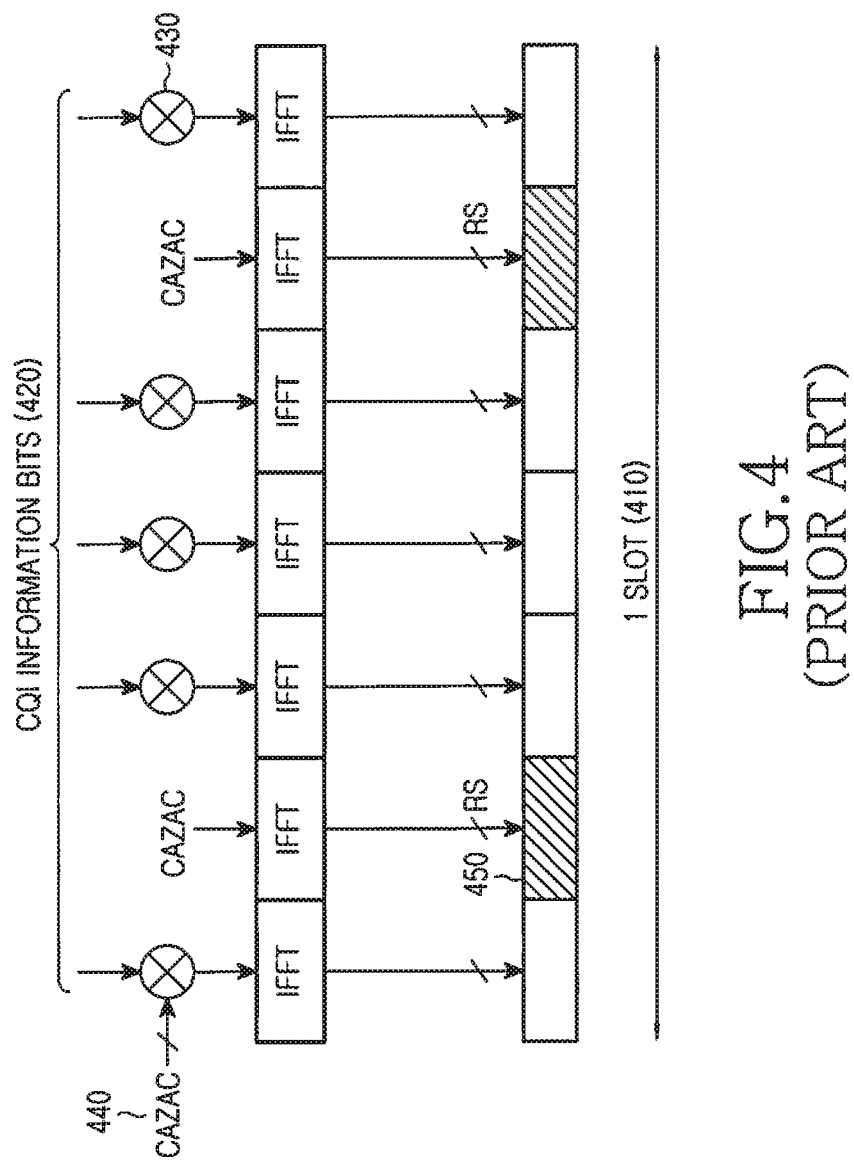
FIG. 4 is a block diagram illustrating a sub-frame structure for CQI transmission in the PUCCH.
Figure 5:
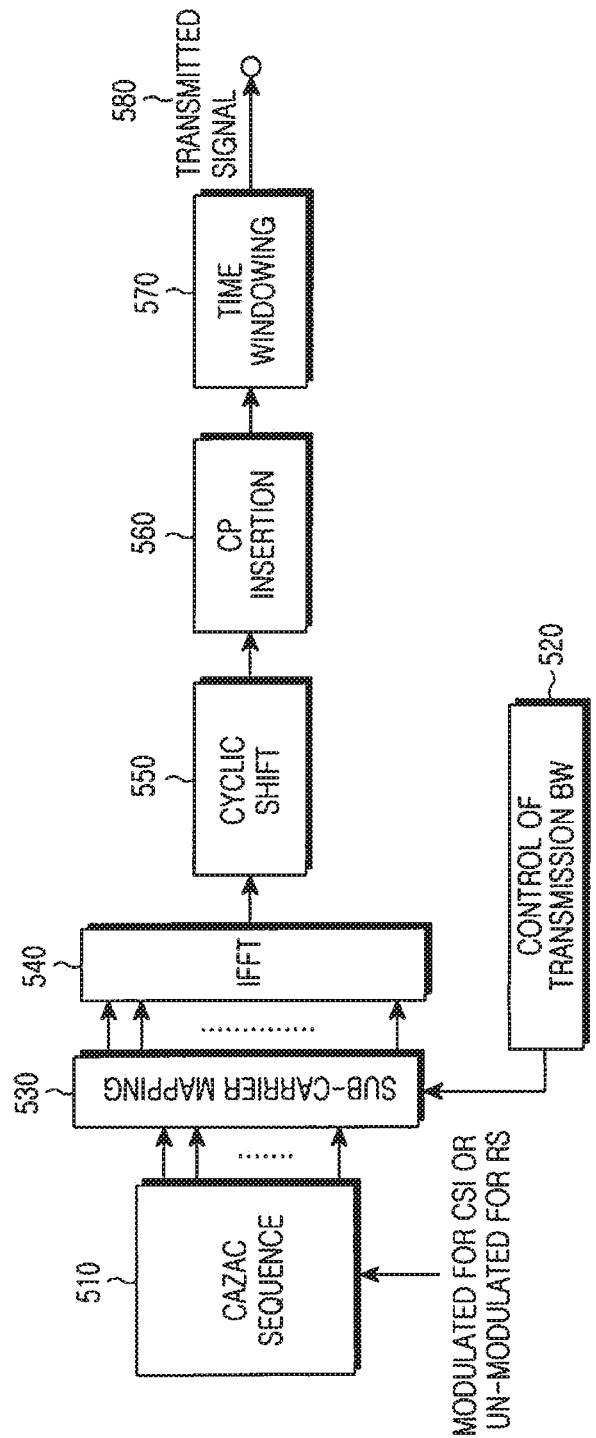
FIG. 5 is a block diagram illustrating a transmitter structure for a CAZAC sequence.
Figure 6:
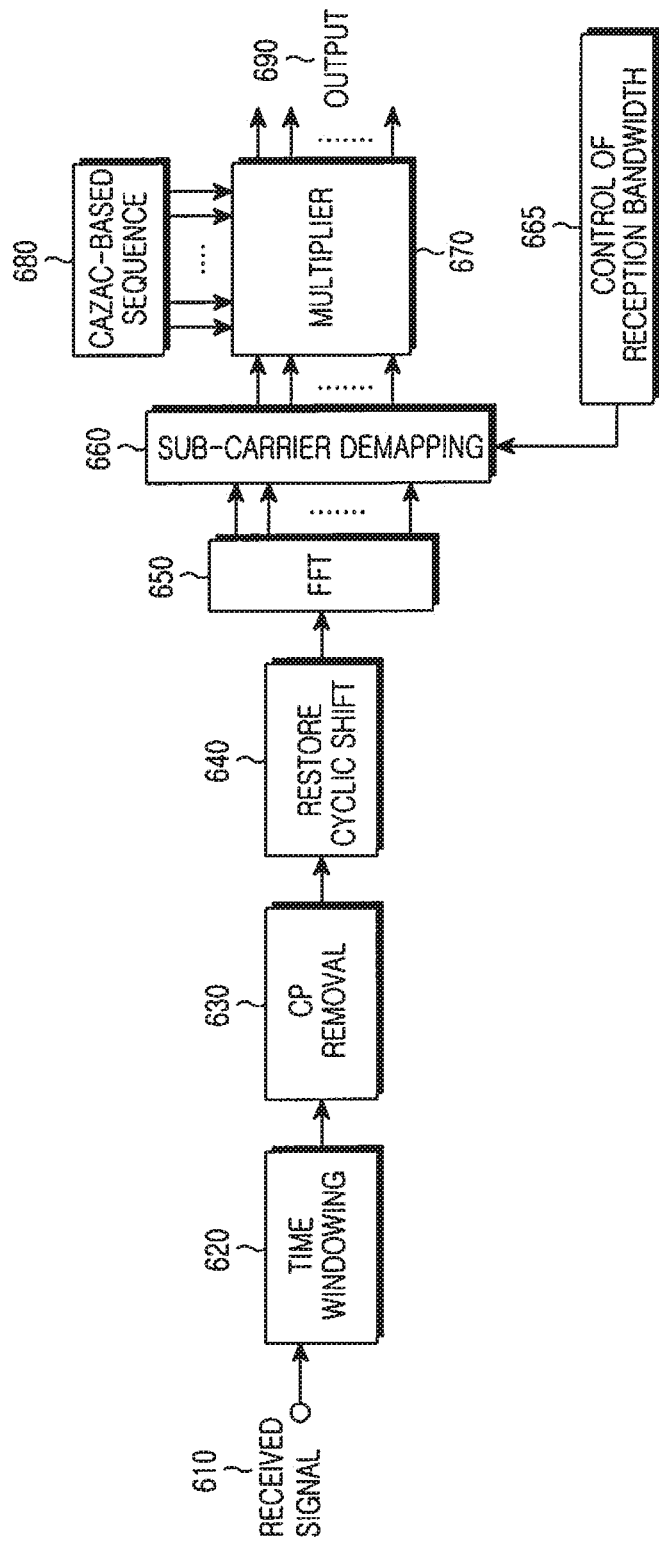
FIG. 6 is a block diagram illustrating a receiver structure for a CAZAC sequence.
Figure 7:
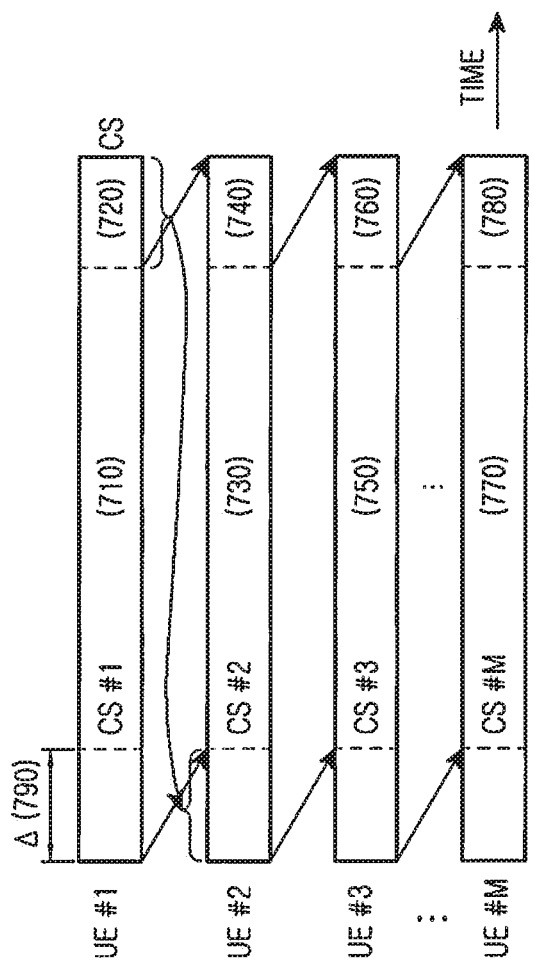
FIG. 7 is a diagram illustrating multiplexing of CAZAC sequences through the application of different cyclic shifts.
Figure 8:
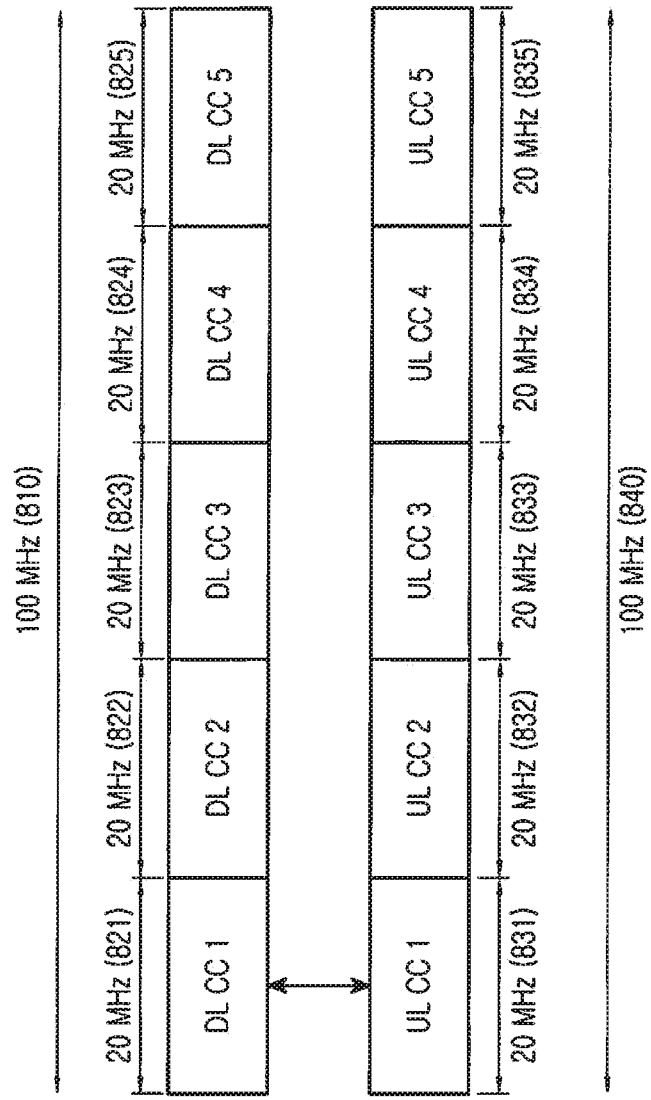
FIG. 8 is a diagram illustrating the principle of Carrier Aggregation (CA)
Figure 9:
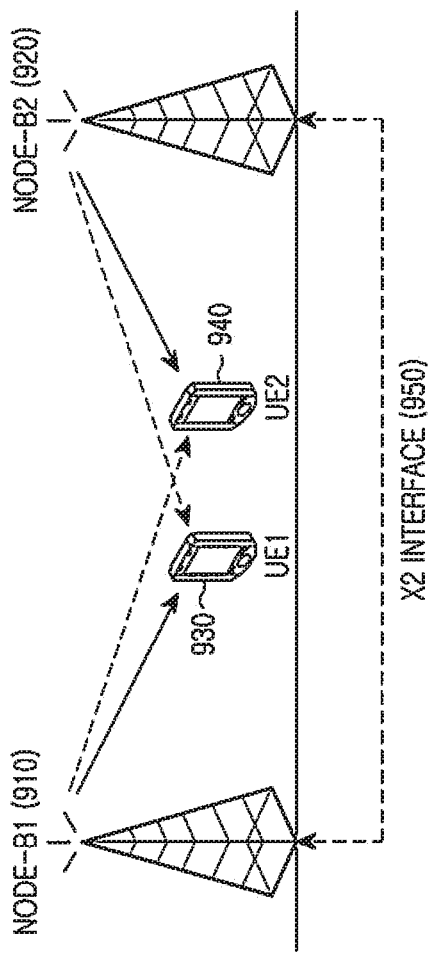
FIG. 9 is a diagram illustrating the application of the Downlink CoMP principle.
Figure 11:
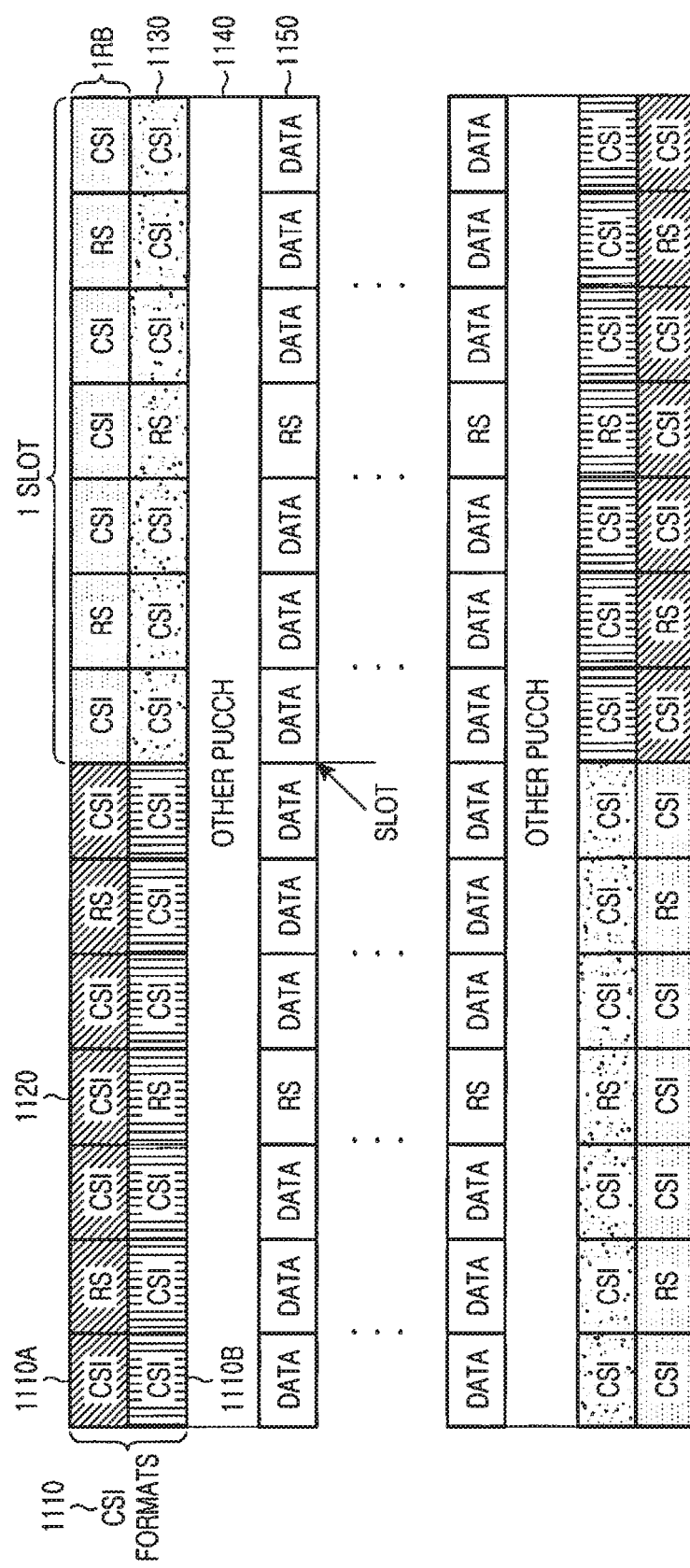
FIG. 11 is a diagram illustrating the concept of using multiple PUCCH formats to transmit UCI according to its payload.

FIG. 11 illustrates the concept of using multiple PUCCH formats 1110 (format 2 1110A and format 3 1110B) for CSI transmission. The structure of the PUCCH format for small CSI payloads and high UE multiplexing capacity can be as described in FIG. 4 and will be referred to as PUCCH format 2 1120. The structure of the PUCCH format for large CSI payloads and lower UE multiplexing capacity can be as described in FIG. 1 for the PUSCH and will be referred to as PUCCH format 3 1130. Unlike PUCCH format 2 for which CSI transmission is always confined to one PRB, the CSI transmission for PUCCH format 3 may be in one or more PRBs. The total BW allocated in each sub-frame to the PUCCH formats for CSI transmission, in number of PRBs, can be signaled by the Node B through a broadcast channel. In the embodiment, after the BW for PUCCH formats 2 and 3 is allocated, the adjacent PRBs towards the interior of the operating BW can be used for other PUCCH transmissions 1140, such as SR or HARQ-ACK transmissions which for L-UEs are assumed to be through the use of a PUCCH formats which will be referred to as PUCCH format 1. Subsequently, the remaining PRBs in the interior of the operating BW can be allocated to PUSCH transmissions 1150.

Figure 1:
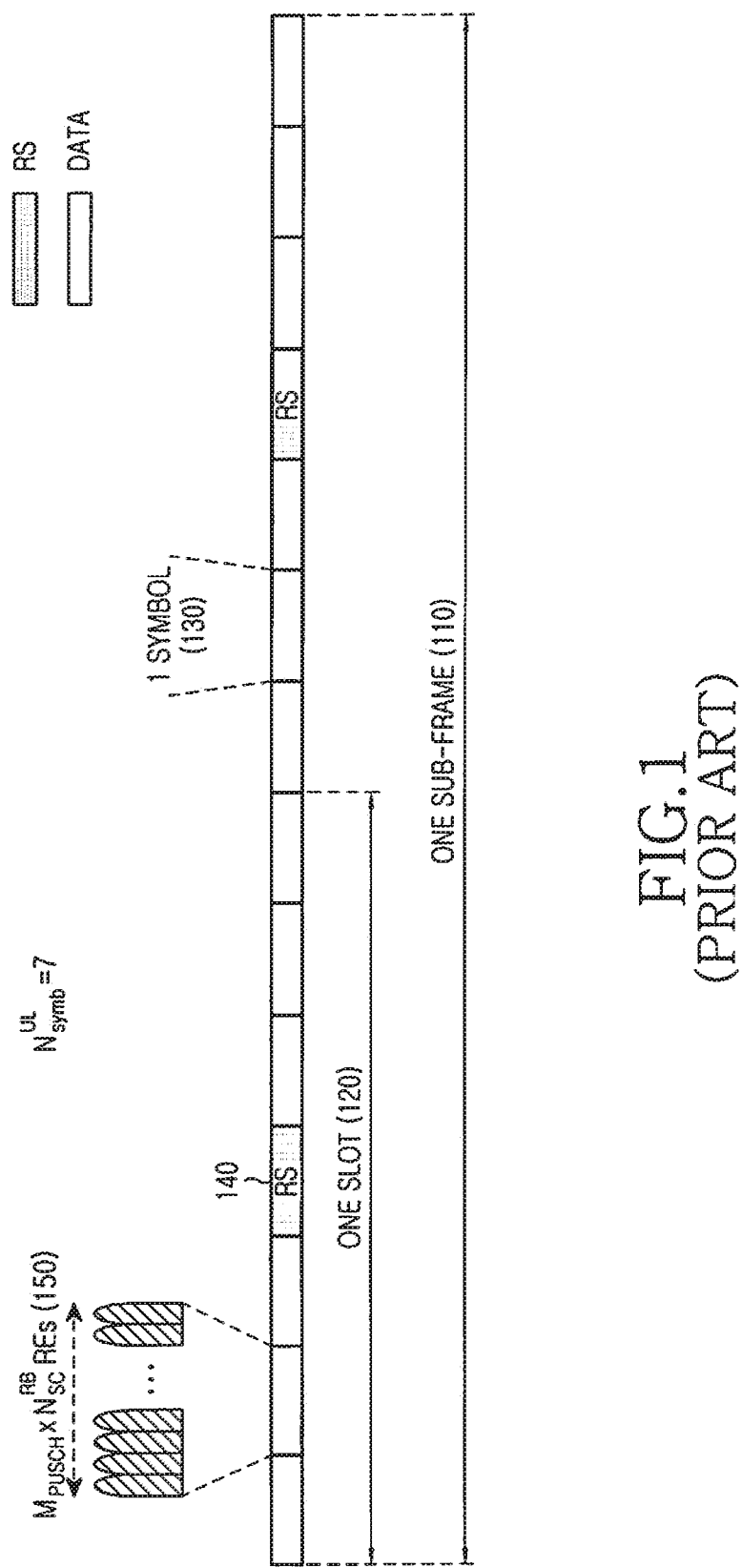
FIG. 1 is a diagram illustrating a sub-frame structure for PUSCH transmission.
Figure 2:
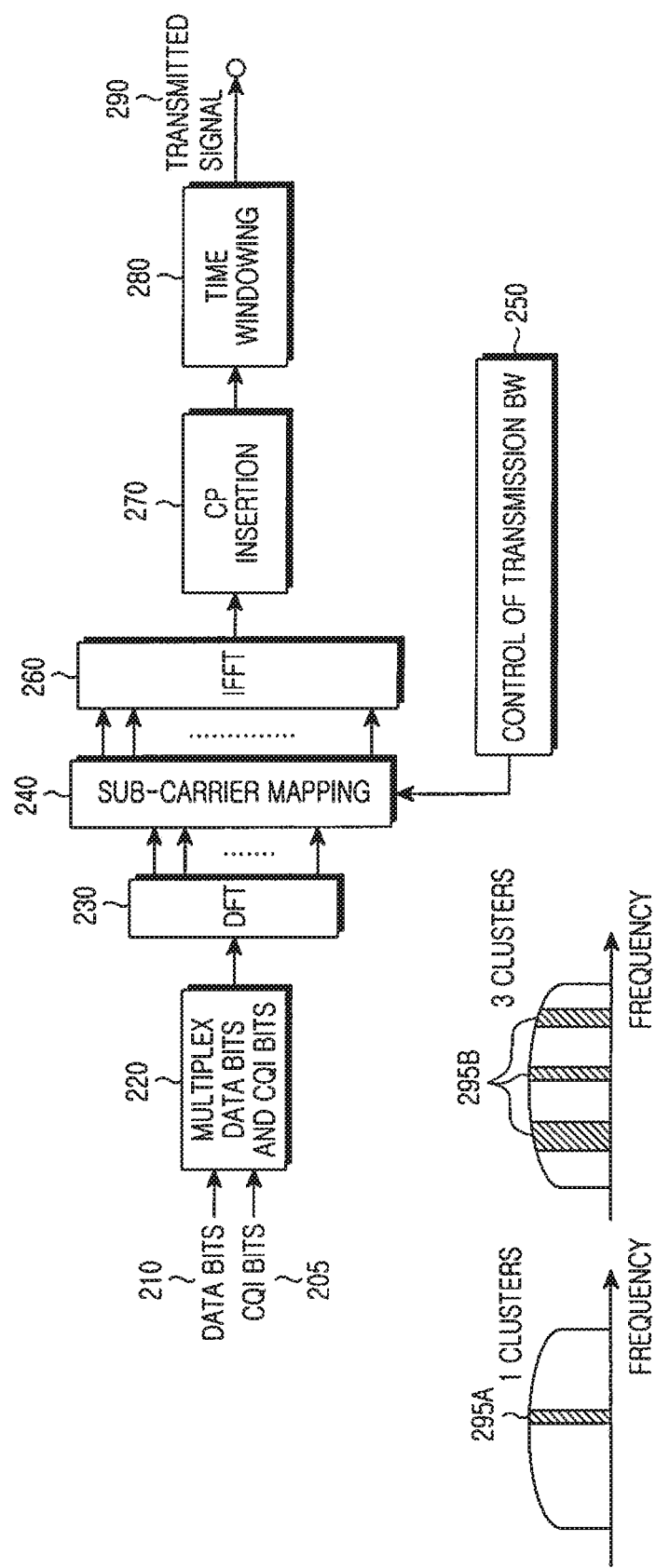
FIG. 2 is a block diagram illustrating a transmitter structure for the transmission of data information and control information in the PUSCH.
Figure 3:
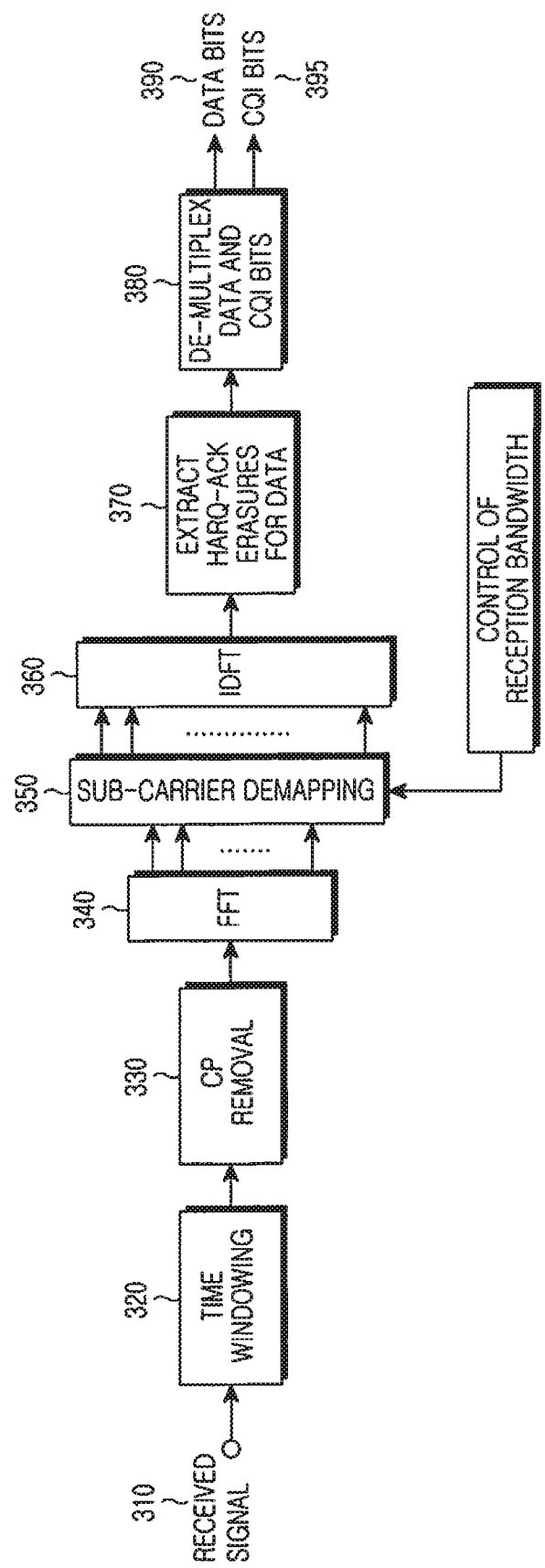
FIG. 3 is a block diagram illustrating a receiver structure for the reception of data information and control information in the PUSCH.

Unlike PUCCH format 2 where multiple UEs, for example six UEs, can have CSI transmission in the same PRB using different cyclic shifts of a CAZAC sequence (FIG. 4), only one UE can have CSI transmission using PUCCH format 3 having the PUSCH sub-frame structure (FIG. 1). As a consequence, the UL overhead resulting from the use of PUCCH format 3 is substantially increased, for example by a factor of six.

The second object of the invention considers the multiplexing of CSI transmissions from multiple UEs in the PUCCH format 3 and establishes a trade-off between the payload size and the multiplexing capacity in order to control the respective UL overhead. For example, a goal can be to allow flexible multiplexing of CSI transmissions from up to four UEs in PUCCH format 3 and use PUCCH format 2 for multiplexing CSI transmissions from six UEs. The supportable CSI payloads in PUCCH format 3 can progressively decrease as the UE multiplexing capacity increases and the smallest CSI payload and largest UE multiplexing capacity can be provided by PUCCH format 2. For example, PUCCH format 3 can be used for CSI transmission of payloads above 20 bits from 1-4 UEs while PUCCH format 2 can be used for CSI transmission of payloads of about 10 bits from 6 UEs.

Figure 12:
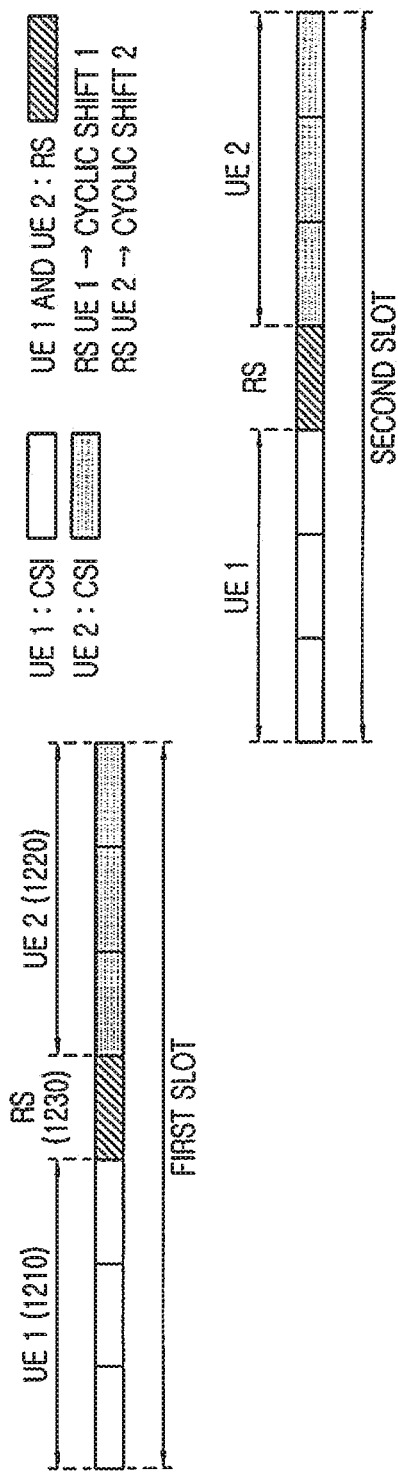
FIG. 12 is a diagram illustrating Time Division Multiplexing (TDM) of 2 UEs in a PUCCH format having the PUSCH sub-frame structure.

FIG. 12 illustrates the multiplexing of 2 UEs in PUCCH format 3 using the PUSCH sub-frame structure in accordance with the second object of the invention. The CSI feedback from 2 UEs is multiplexed in one PRB. The first UE, UE1 1210, has CSI transmission in the first part of each slot and the second UE, UE2 1220, has CSI transmission in the second part of each slot. The RS from the first or the second UE 1230 is transmitted using a respective first cyclic shift or a second cyclic shift of the CAZAC sequence used in the cell. Each UE can have its own pre-assigned MCS for the CSI feedback transmission (all transmission parameters for CSI signaling in the PUCCH are allocated by higher layers). Since each PRB is assumed to consist of 12 REs, each UE can transmit 144 coded CSI bits with QPSK modulation, or 72 CSI information bits with code rate of 1/2, or 64 CSI information bits and 8 Cyclic Redundancy Check (CRC) bits. Such CSI payloads are substantially larger than 10 bits CSI payload which can be supported using PUCCH format 2 with code rate of 1/2, such as the punctured (20, 10) RM code.

In the case of UEs with moderate or high SINRs or with enhanced transmission or reception based on respective antenna diversity, the received signal is reliable enough to support CSI transmission with a modulation order greater than QPSK, such as 8PSK or QAM16, or with a higher code rate, such as 2/3. For such UEs, CSI transmission can be in only one slot to increase the UE multiplexing capacity in PUCCH format 3 and reduce the respective UL overhead.

Figure 13:
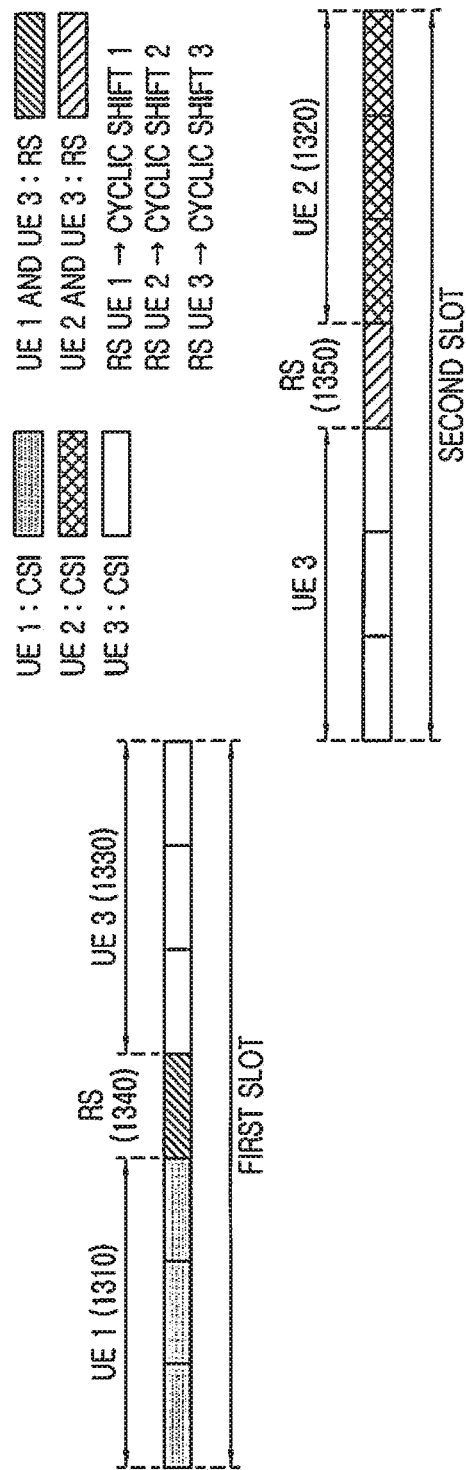
FIG. 13 is a diagram illustrating Time Division Multiplexing (TDM) of 3 UEs in a PUCCH format having the PUSCH sub-frame structure.

FIG. 13 illustrates the multiplexing of 3 UEs in PUCCH format 3 using the PUSCH sub-frame structure. CSI from a first UE, UE1 1310, is transmitted only in the first part of the first slot of the sub-frame, CSI from the second UE, UE2 1320, is transmitted only in the second part of the second slot of the sub-frame, while CSI from a third UE, UE3 1330, is transmitted in both slots of the sub-frame. The position in each slot of the CSI transmission from each UE is exemplary. The RS 1340 from UE1 and UE2 and the RS 1350 for UE2 and UE3 are multiplexed in the respective slots using different cyclic shifts of the same CAZAC sequence.

Figure 14:
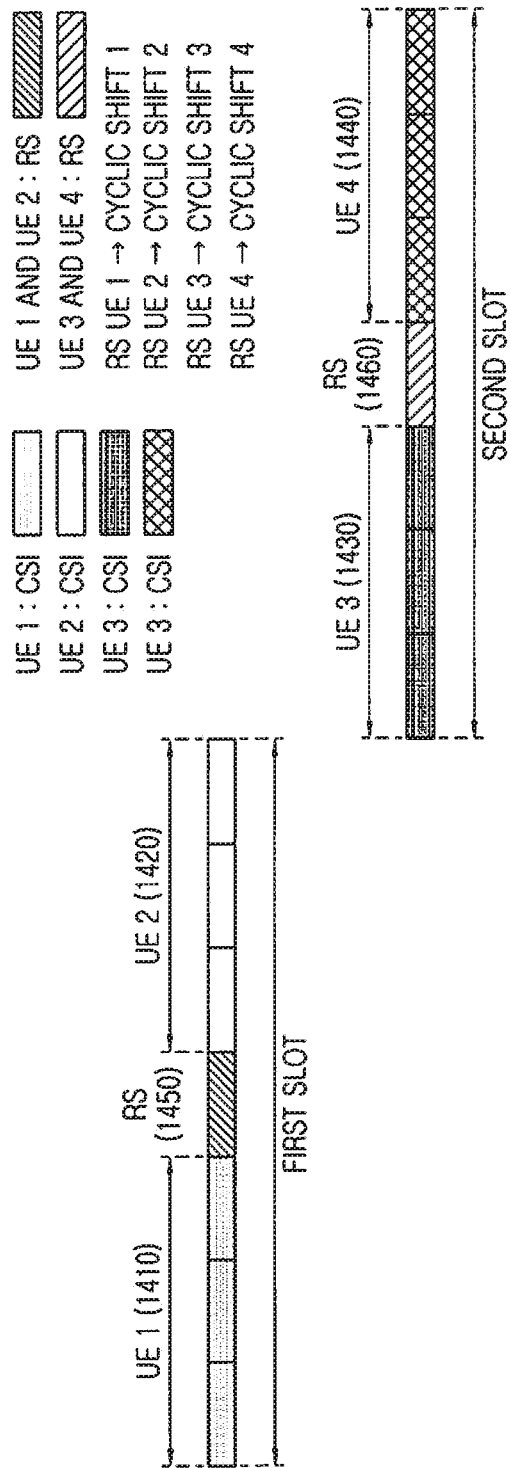
FIG. 14 is a diagram illustrating Time Division Multiplexing (TDM) of 4 UEs in a PUCCH format having the PUSCH sub-frame structure.

Following the same principles, FIG. 14 illustrates the multiplexing of 4 UEs in PUCCH format 3 using the PUSCH sub-frame structure. CSI from a first UE, UE1 1410, is transmitted only in the first part of the first slot of the sub-frame, CSI from the second UE, UE2 1420, is transmitted only in the second part of the first slot of the sub-frame, CSI from a third UE, UE3 1430, is transmitted only in the first part of the second slot of the sub-frame, and CSI from the fourth UE, UE4 1440, is transmitted only in the second part of the second slot of the sub-frame. The RS 1450 from UE1 and UE2 and the RS 1460 for UE3 and UE4 are multiplexed in the respective slots using different cyclic shifts of the same CAZAC sequence.

Figure 15:
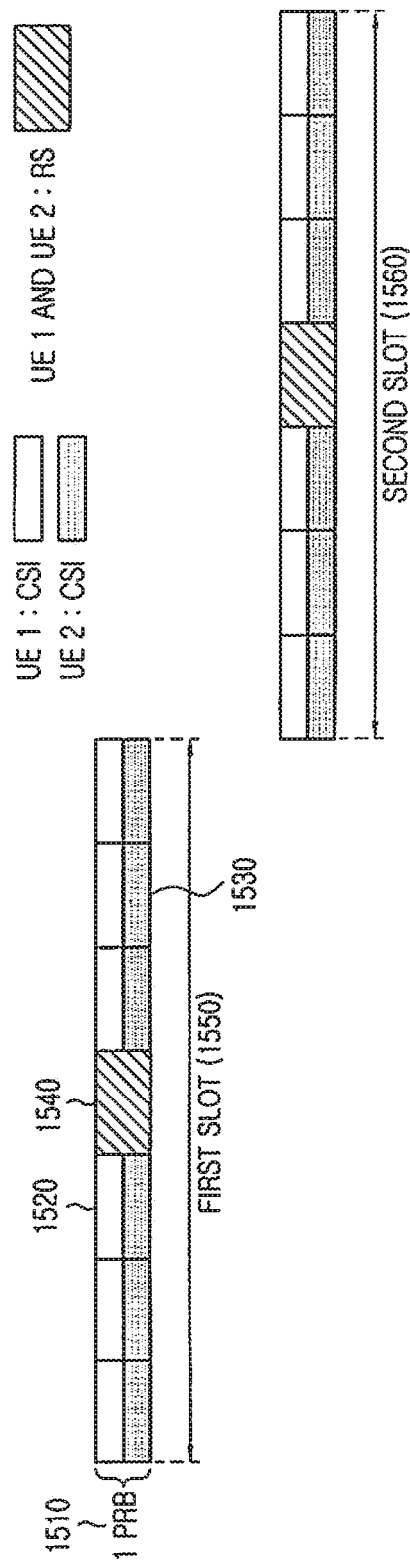
FIG. 15 is a diagram illustrating Frequency Division Multiplexing (FDM) of 2 UEs in a PUCCH format having the PUSCH sub-frame structure.

In addition to the Time Division Multiplexing (TDM) structure described in FIG. 12 through FIG. 14, Frequency Division Multiplexing (FDM) can also be applied as shown in FIG. 15 for the case of 2 UEs. The $N_{sc}^{RB}=12$ REs of one PRB 1510 are divided in a top sub-set of 6 contiguous REs allocated to a first UE, UE 1 1520, and bottom sub-set of 6 contiguous REs allocated to a second UE, UE 2 1530. Unlike the CSI transmission from each UE which is over half the BW of a PRB, the RS transmission 1540 from each UE occupies the entire PRB and the multiplexing is through the use of two different CSs, one CS for each UE, of the same CAZAC sequence as it was previously described. The reason for the RS transmission being over the entire PRB is to avoid a reduction in the number of available CAZAC sequences that would result from reducing their length to less than 12. Each UE transmits in both the first slot 1550 and the second slot 1560 of the sub-frame. FDM can be generalized to more than 2 RE clusters per PRB, the relative position of the clusters may change on a sub-frame symbol basis or on a slot basis (not shown for brevity). Additionally, FDM can be generalized so that the REs allocated to each UE are not contiguous. For example, the first UE may be allocated REs 1, 3, 5, 7, 9, and 11 while UE2 may be allocated REs 2, 4, 6, 8, 10, and 12.

Figure 16:
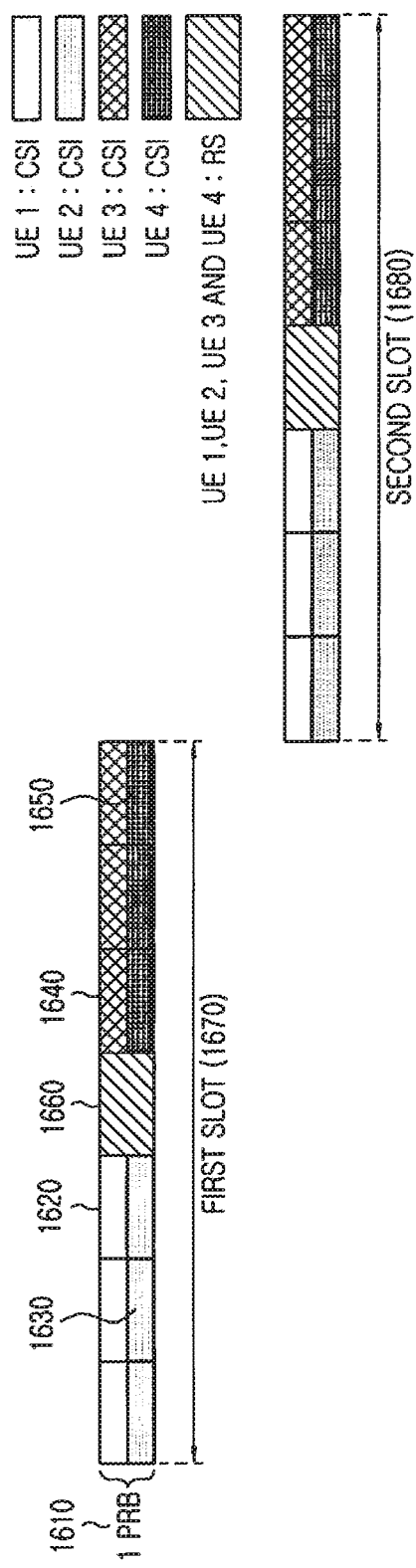
FIG. 16 is a diagram illustrating Time Division Multiplexing (TDM) and Frequency Division Multiplexing (FDM) of 4 UEs in a PUCCH format having the PUSCH sub-frame structure.

FDM can be combined with TDM as shown, for example, in FIG. 16. The $N_{sc}^{RB}=12$ REs of one PRB 1610 are again divided in a top sub-set of 6 contiguous REs allocated to a first UE, UE 1 1620, and bottom sub-set of 6 contiguous REs allocated to a second UE, UE 2 1630 in the first part of each slot and to a third UE, UE 3 1640, and to a fourth UE, UE 4 1650, respectively, in the second part of each slot. The RS transmission 1650 from each UE occupies the entire PRB and the multiplexing is through the use of four different CS, one CS for each UE, of the same CAZAC sequence as it was previously described. Each UE transmits in both the first slot 1660 and second slot 1670 of the sub-frame.

Figure 17:
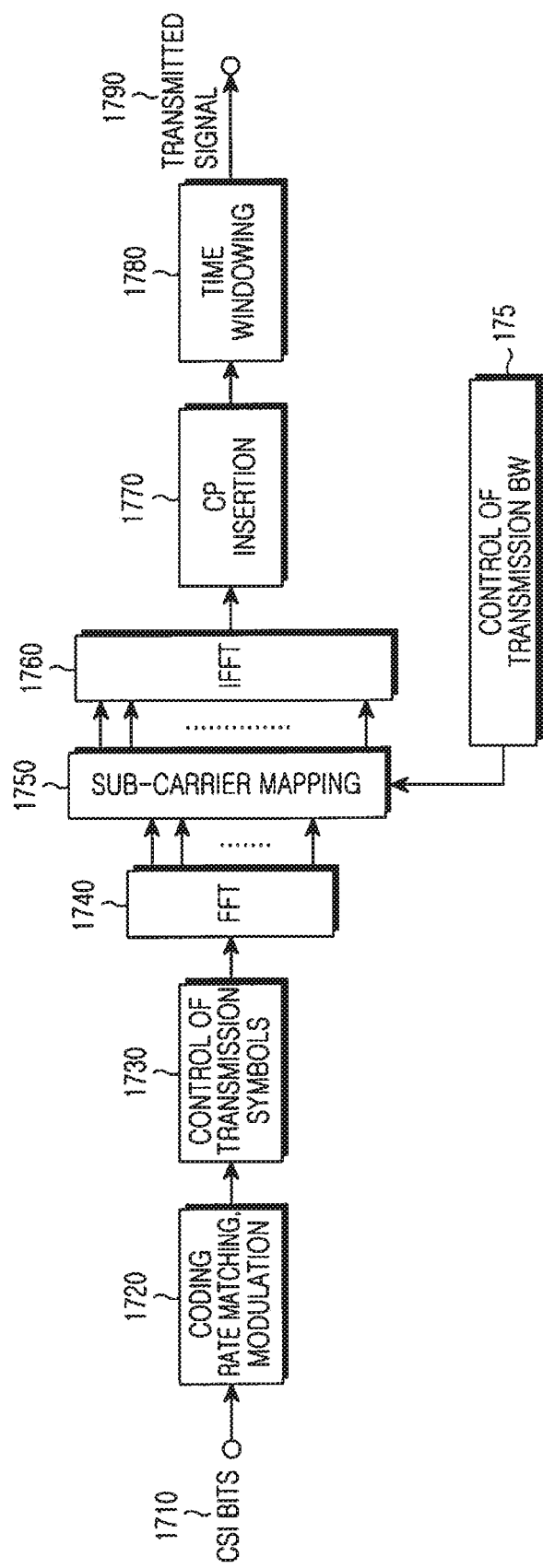
FIG. 17 is a block diagram illustrating a transmitter for UCI transmission using a PUCCH format having the PUSCH sub-frame structure.

FIG. 17 illustrates a transmitter block diagram for the CSI transmission using the PUSCH sub-frame structure. The CSI information bits 1710 are coded, rate matched to the allocated resources, and modulated in Coding, Rate Matching and Modulation unit 1720. A controller 1730 selects the PUSCH sub-frame symbols over which the CSI is transmitted. The DFT of the combined data bits, if any, and CSI bits is then obtained in DFT unit 1740, the REs are produced in Sub-Carrier Mapping unit 1750 corresponding to the assigned transmission BW are selected by control unit 175, the IFFT is performed by IFFT unit 1760 and finally the CP is inserted in CP Insertion unit 1770 and filtering is performed in Time Windowing unit 1780, which outputs the transmitted signal 1790. For brevity, additional transmitter circuitry such as digital-to-analog converter, analog filters, amplifiers, and transmitter antennas are not illustrated. The placement of the controller 1730 for the selected PUSCH sub-frame symbols with CSI transmission in the transmitter chain is exemplary and another location may instead be used (for example, the controller 1730 may be placed immediately after the CP insertion 1770).

Figure 18:
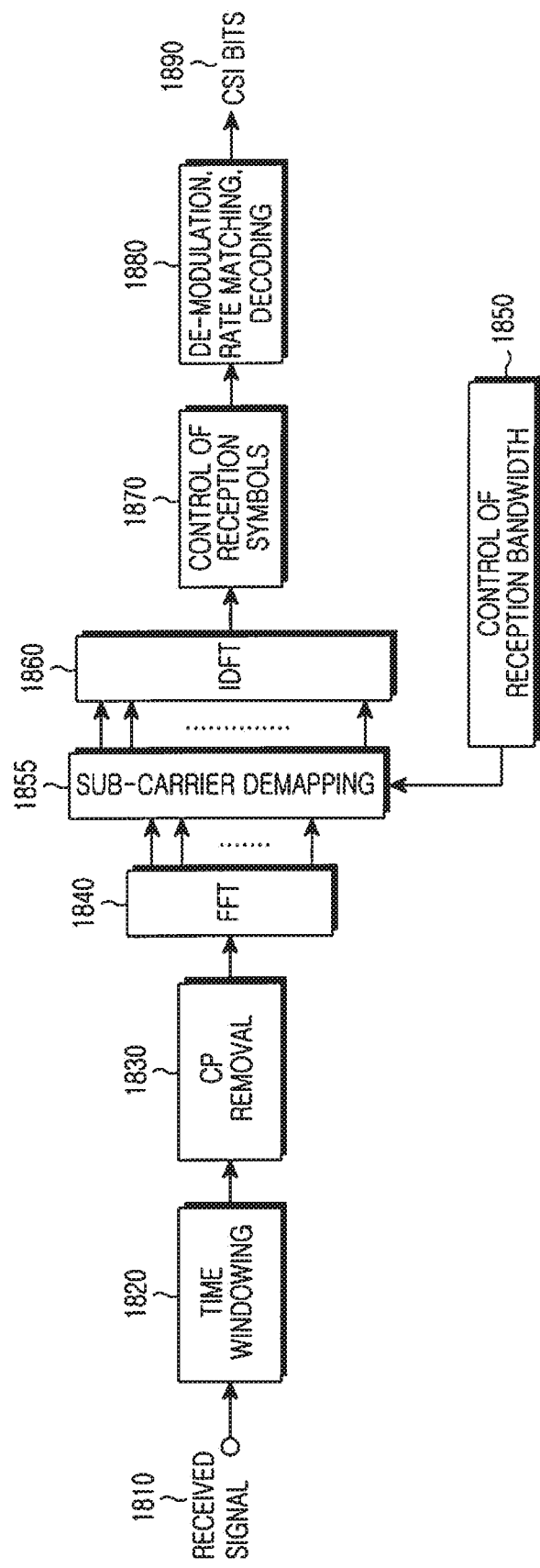
FIG. 18 is a block diagram illustrating a receiver for UCI transmission using a PUCCH format having the PUSCH sub-frame structure.

FIG. 18 illustrates a receiver block diagram for the CSI transmitted using the PUSCH sub-frame structure. The reverse (complementary) operations of FIG. 17 are performed. After an antenna receives the Radio-Frequency (RF) analog signal and after further processing units (such as filters, amplifiers, frequency down-converters, and analog-to-digital converters) which are not shown for brevity, the digital signal 1810 is filtered in Time Windowing Unit 1820 and the CP is removed in CP Removal unit 1830. Subsequently, the receiver unit applies an FFT in FFT unit 1840, selects by Control unit 1850 the REs used by the transmitter in Sub-Carrier Demapping unit 1855, applies an IDFT in IDFT unit 1860, and selects the PUSCH sub-frame symbols over which the CSI is transmitted from a reference UE in control unit 1870. Then, after demodulation, rate matching, and decoding in De-Modulation, Rate-Matching and Decoding unit 1880, the CSI bits are obtained 1890. As for the transmitter, well known receiver functionalities such as channel estimation, demodulation, and decoding are not shown for brevity. The placement of the controller 1870 for the selected PUSCH sub-frame symbols with CSI transmission is exemplary and another location may instead be used (for example, the controller 1870 may be placed immediately before the CP removal unit 1820). Note that for both the RS transmission and the RS reception, the conventional transmitter and receiver structures for CAZAC sequences respectively apply with the only consideration being that more than one UE transmit RS in the same PRB using different cyclic shifts of the same CAZAC sequence.

Therefore, the second object of the present invention provides method and means for multiplexing the CSI transmission from up to 4 UEs in a PUCCH format having the PUSCH sub-frame structure. The tradeoff is the increased multiplexing capacity at the expense of reduced CSI symbol space for each UE. The multiplexing of transmissions can be generalized to support transmissions of both CSI and data. For example, in FIG. 12, the first UE may transmit CSI while the second UE may transmit data such as a Voice over Internet Protocol (VoIP) packet.

Although CSI transmissions with PUCCH format 3 can be either periodic or dynamic, the objective to minimize the PDCCH overhead requires that these CSI transmissions are periodically configured with parameters provided to each respective UE through higher layer signaling. However, this reduces the flexibility in managing the CSI transmissions depending on their usefulness. The third object of the present invention provides a tradeoff between having full flexibility of a CSI transmission that is dynamically scheduled per sub-frame through a respective PDCCH transmission to a UE and having limited flexibility of a CSI transmission that is semi-statically scheduled to occur periodically in predetermined sub-frames. A trade-off between these two extreme setups can be achieved by grouping multiple UEs in a "CSI group", such as for example a group of DL CoMP UEs, and dynamically scheduling the CSI transmission of selected UEs in a CSI group, using preconfigured transmission parameters, through the transmission of a PDCCH format which will be referred to as PDCCH CSI format.

Figure 19:
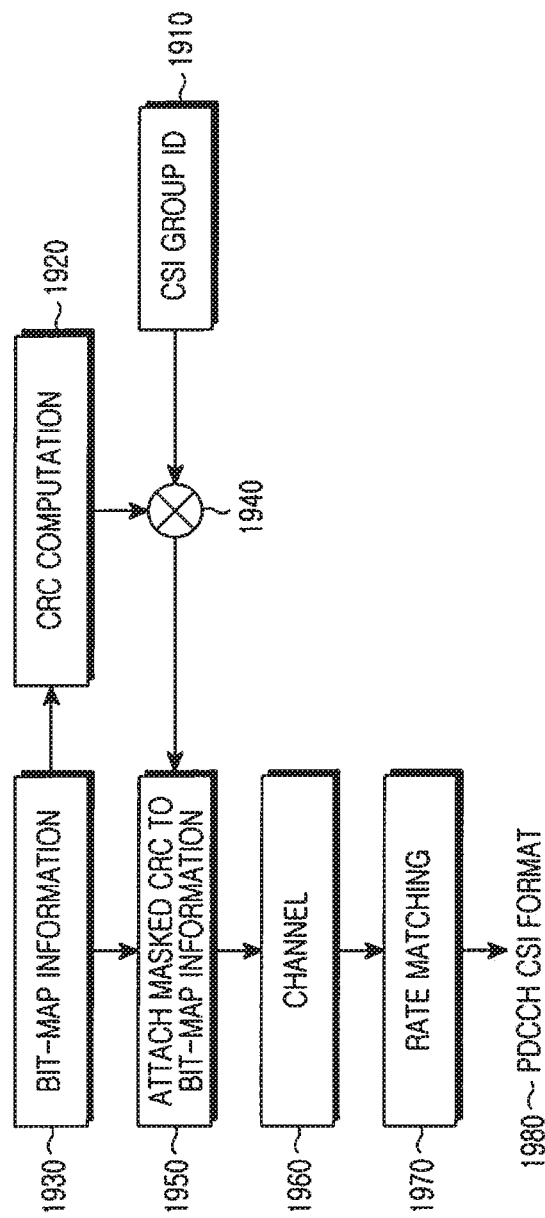
FIG. 19 is a block diagram illustrating a transmission process for the PDCCH CSI format from the Node B.

FIG. 19 describes the PDCCH CSI format transmission from the Node B. A group of UEs is assigned a CSI group IDentity (ID) in 1910. The PDCCH CSI format uses the CSI group ID for identification. For example, the CRC computed in 1920 from the bit-map information from 1930 conveyed by the PDCCH CSI format is masked by the CSI group ID though an exclusive OR (XOR) operation in 1940. The masked CRC is then appended to the bit-map information in 1950, channel coding is applied in 1960, rate matching to the allocated transmission resources is performed in 1970, and finally the PDCCH CSI format is transmitted in 1980.

Figure 20:
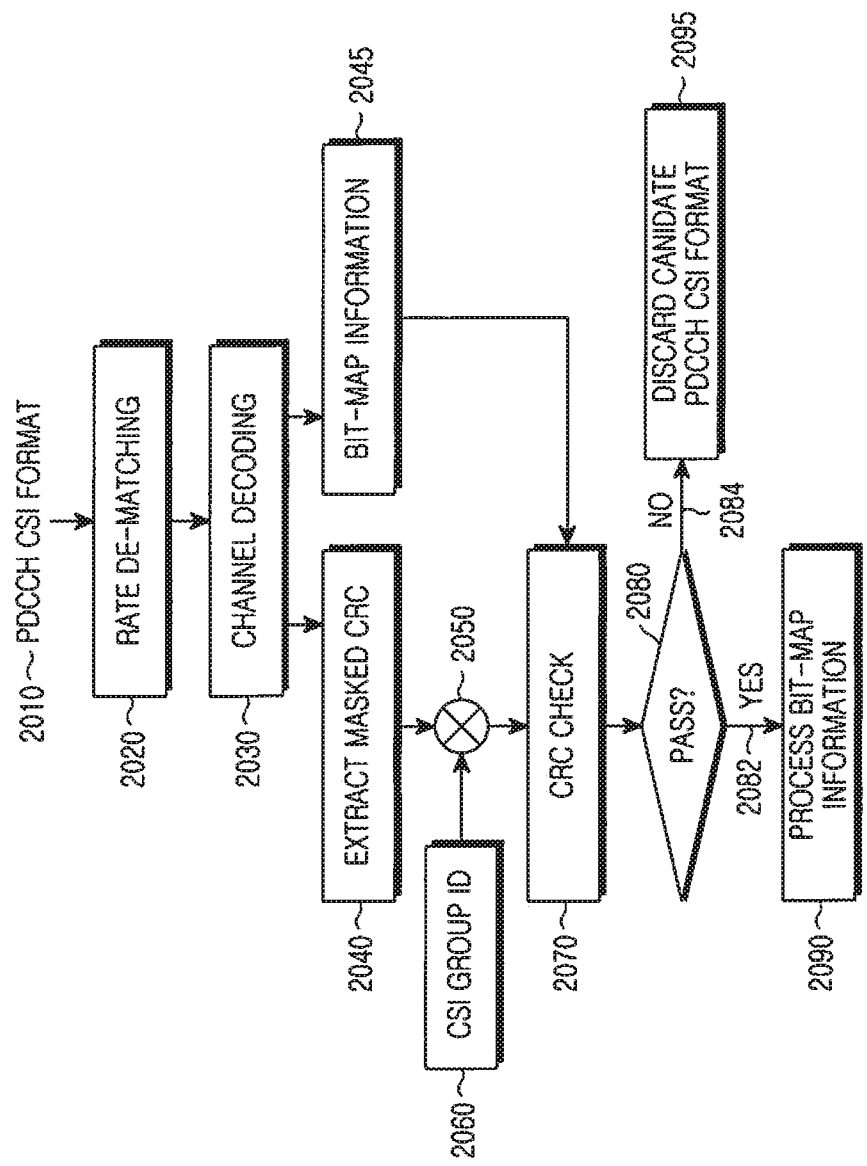
FIG. 20 is a block diagram illustrating a reception process for the PDCCH CSI format from a UE.

At the UE receiver the reverse operations are performed as described in FIG. 20. A received candidate PDCCH CSI format 2010 is rate de-matched in 2020, decoded in 2030, and the masked CRC 2040 and the bit-map information are extracted in 2045. The masked CRC is then unmasked by performing the exclusive OR (XOR) operation in 2050 with the CSI group ID 2060. Then, the CRC checking is performed in 2070 and it is determined in 2080 whether the CRC passes 2082 or not 2084. If the CRC passes, the candidate PDCCH CSI format is considered valid and the bit-map information is further processed by the UE in 2090. If the CRC does not pass, the candidate PDCCH CSI format is considered invalid and its contents are discarded from further processing in 2095.

A CSI group c consists of $N_{CSI}$ UEs and all CSI groups are assumed to have the same size. A UE may belong to multiple CSI groups where each of those CSI groups corresponds to the transmission of different CSI payloads. A total of $M_c$ resources are allocated to the CSI transmission from UEs in CSI group c. This information is known to all UEs and can be communicated by the Node B to each UE either through broadcast signaling or through dedicated higher layer signaling. The bit-map information consists of at least $N_{CSI}$ bits and its size can be selected to be equal to the size of another PDCCH format the UE always attempts to decode, such as for example the PDCCH format scheduling data transmissions from the UE in the PUSCH, so that there are no additional blind decoding operations (only an additional CRC unmasking and checking). Otherwise, the CSI PDCCH format can be padded so that it achieves a size equal to the size of another PDCCH format the UEs always decode. The CSI PDCCH format may also contain Transmission Power Control (TPC) commands with each TPC command associated with a UCI transmission by the respective UE. Alternatively, a separate PDCCH format may be used to provide these TPC commands and, for the simplicity of the description, this will be assumed in the following.

Figure 21:
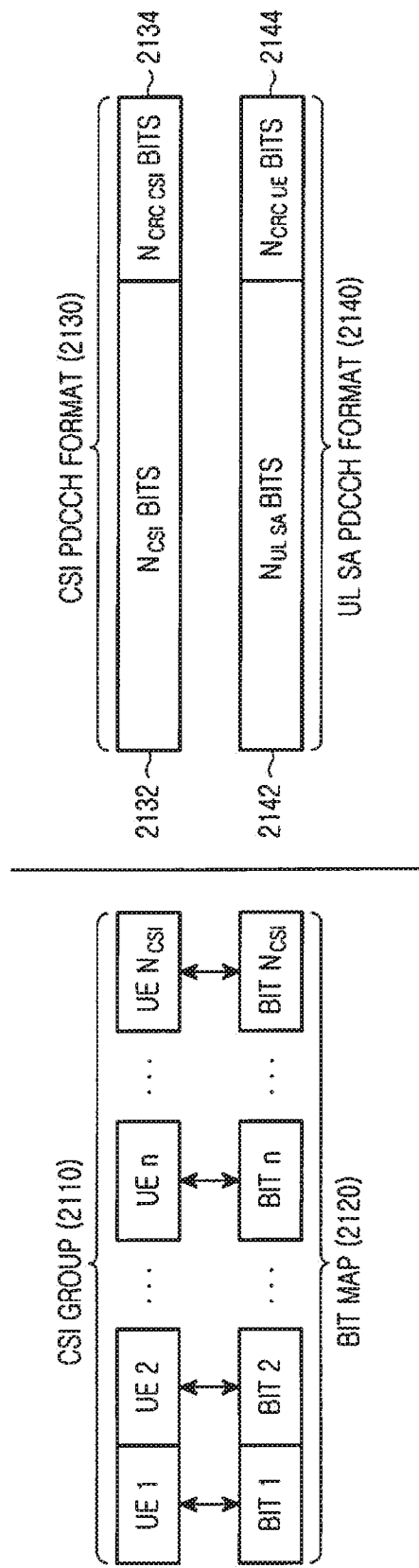
FIG. 21 is a diagram illustrating the 1-to-1 mapping between the UEs in a CSI group and the bits in the PDCCH CSI format bit-map.

Each UE is also informed through higher layer signaling of its position in the CSI group relative to other UEs in the group and there is a 1-to-1 mapping between a bit in the bit-map and a UE in the CSI group. FIG. 21 illustrates the 1-to-1 mapping between the UEs in the CSI group 2110 and the bits in the PDCCH CSI format bit-map 2120. Each UE may also be informed of the MCS it should use for the CSI transmission for a respective CSI payload; otherwise, the MCS is assumed to be predetermined either for each CSI group (common to all UEs in the same CSI group) or for all CSI groups (common to all UEs in all CSI groups). The resources used for the CSI transmission are assumed to be the same for all UEs in the same CSI group, such as for example multiplexing 1 UE in 1 PRB over 1 sub-frame for UEs in a first CSI group or multiplexing 2 UEs in 1 PRB over 1 sub-frame for UEs in a second CSI group. The first PRB used by the first CSI group, if more than 1 CSI groups exist in a given sub-frame, may either be predetermined to be the first PRB in the operating BW or it may be communicated to the UEs through broadcast signaling by the Node B, or it may be informed by some predetermined bits in the PDCCH CSI format. As previously mentioned, the size of the PDCCH CSI format 2130, which consists of $N_{CSI}$ bit-map bits 2132 and $N_{CRC\_CSI}$ CRC bits masked with the CSI group ID 2134, may be the same as the size of a PDCCH format 2140 conveying a UL Scheduling Assignment (SA) to a UE for PUSCH transmission with data and consists of $N_{UL\_SA}$ bits 2142 providing the scheduling information and $N_{CRC\_UE}$ CRC bits masked with the reference UE ID 2144. That is, $N_{CSI}+N_{CRC\_CSI}=N_{UL\_SA}+N_{CRC\_UE}$. The length of the CRC for the PDCCH CSI format may be less than the length of the UL SA PDCCH format since a smaller number of UEs will typically attempt to decode the PDCCH CSI format.

Figure 22:
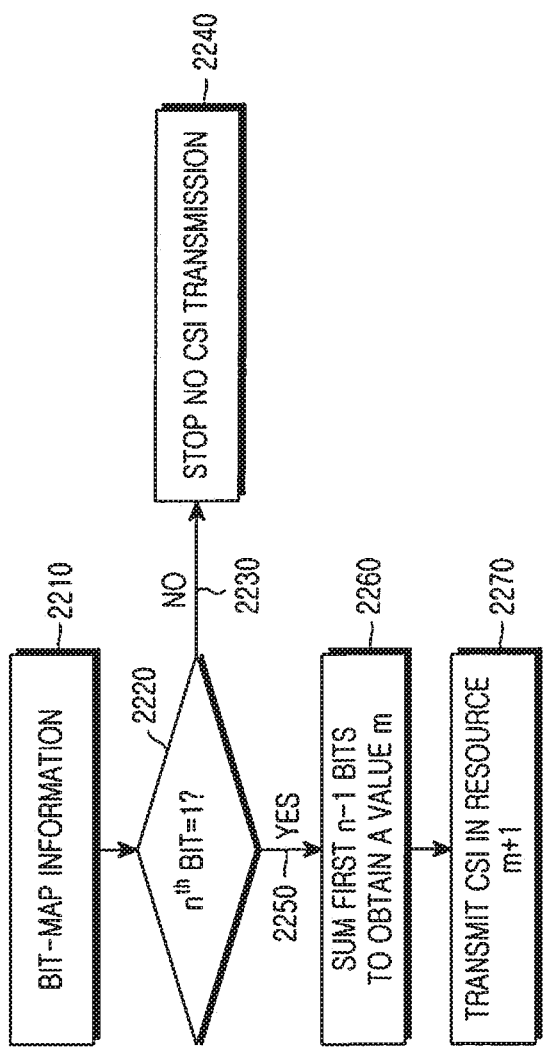
FIG. 22 is a diagram illustrating the processing of the bit-map information by a UE in the CSI group addressed by a respective PDCCH CSI format.

The UE processing of the bit-map information in FIG. 19 is described in FIG. 22. It is assumed that a bit value of 0 in the bit-map indicates that the corresponding UE in the CSI group should not transmit CSI while a bit value of 1 indicates CSI transmission. After successfully decoding the candidate PDCCH CSI format and obtaining the bit-map information 2210, the $n^{th}$ UE in the CSI group determines in 2220 whether the value of the $n^{th}$ bit is equal to 1. If it is not equal to 1 (i.e. 2230), the UE does not transmit CSI in 2240. If it is equal to 1 (i.e. 2250), the UE determines the sum m of the previous n−1 bits, if any, in 2260 and transmits CSI using resource m+1 in 2270. The processing steps need not necessarily be in the previously described order (for example, the UE may first obtain the sum of the first n−1 bits or it may simply compute the number of bits, in the first n−1 bits, having value 1). Nevertheless, the functionalities for determining the resource for CSI transmission at the referenced $n^{th}$ UE are fully described by FIG. 22.

The PDCCH CSI format can be generalized to request transmission of different CSI types. For example, a first CSI type can be CQI and a second CSI type can be the coefficients of the channel medium. For this generalized PDCCH CSI format, the same principles apply as previously described, with the only exception that the bit-map now includes more than 1 bit for each UE such as, for example, 2 bits. A UE determines the resources for the assigned type of CSI transmission, if any, by considering the UEs with CSI transmission of the same type having an earlier bit-map location as it was previously described for the case of 1 bit per UE in the bitmap.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting uplink control information (UCI) over a physical uplink control channel (PUCCH) in a wireless communication system, the method comprising:
 acquiring, by a user equipment (UE), from a base station, information for configuration of a first PUCCH format associated with more than one resource block, wherein the first PUCCH format is identified based on a number of at least one bit of the UCI;
 generating, by the UE, UCI to be transmitted;
 modulating, by the UE, the UCI by using quadrature phase shift keying (QPSK);
 performing, by the UE, an inverse Fourier transform (IFT) operation on the modulated UCI; and
 transmitting, by the UE, the inverse Fourier transformed UCI using the first PUCCH format.

2. The method of claim 1, further comprising acquiring, by the UE, from a base station, information for a PUCCH format, the information indicating one of the first PUCCH format associated with more than one resource block or a second PUCCH format associated with one resource block.

3. The method of claim 1, wherein the first PUCCH format is defined on one cell among a plurality of cells configured for the UE.

4. The method of claim 1, wherein the first PUCCH format is a PUCCH format 3.

5. The method of claim 1, further comprising performing a Fourier transform (FT) operation on the modulated UCI prior to performing the IFT operation.

6. A method for acquiring uplink control information (UCI) over a physical uplink control channel (PUCCH) in a wireless communication system, the method comprising:
 transmitting, by a base station, to a user equipment (UE), information for configuration of a first PUCCH format associated with more than one resource block;
 receiving, by the base station, from the UE, an uplink signal using the first PUCCH format, wherein the first PUCCH format is identified based on a number of at least one bit of the UCI;
 performing, by the base station, a Fourier transform (FT) operation on the received uplink signal;
 demodulating, by the base station, the Fourier transformed uplink signal by using quadrature phase shift keying (QPSK); and
 acquiring, by the base station, UCI from the demodulated uplink signal.

7. The method of claim 6, further comprising transmitting, by the base station, to the UE, information for a PUCCH format, the information indicating one of the first PUCCH format associated with more than one resource block or a second PUCCH format associated with one resource block.

8. The method of claim 6, wherein the first PUCCH format is defined on one cell among a plurality of cells configured for the UE.

9. The method of claim 6, wherein the first PUCCH format is a PUCCH format 3.

10. The method of claim 6, wherein the UCI is modulated by using QPSK.

11. An apparatus for transmitting uplink control information (UCI) over a physical uplink control channel (PUCCH) in a wireless communication system, the apparatus comprising:
 a transceiver; and
 a controller configured to:
  acquire, from a base station, information for configuration of a first PUCCH format associated with more than one resource block, wherein the first PUCCH format is identified based on a number of at least one bit of the UCI,
  generate UCI to be transmitted,
  modulate the UCI by using quadrature phase shift keying (QPSK),
  perform an inverse Fourier transform (IFT) operation on the modulated UCI, and
  control the transceiver to transmit the inverse Fourier transformed UCI using the first PUCCH format.

12. The apparatus of claim 11, wherein the controller is further configured to control the transceiver to acquire, from a base station, information for a PUCCH format, the information indicating one of the first PUCCH format associated with more than one resource block or a second PUCCH format associated with one resource block.

13. The apparatus of claim 11, wherein the first PUCCH format is defined on one cell among a plurality of cells configured for the UE.

14. The apparatus of claim 11, wherein the first PUCCH format is a PUCCH format 3.

15. The apparatus of claim 11, wherein the controller further configured to perform a Fourier transform (FT) operation on the modulated UCI prior to performing the IFT operation.

16. A base station for acquiring uplink control information (UCI) over a physical uplink control channel (PUCCH) in a wireless communication system, the base station comprising:
 a transceiver; and
 a controller configured to:
  control the transceiver to transmit, to a user equipment (UE), information for configuration of a first PUCCH format associated with more than one resource block, control the transceiver to receive, from the UE, an uplink signal using it the first PUCCH format, wherein the first PUCCH format is identified based on a number of at least one bit of the UCI, perform a Fourier transform (FT) operation on the received uplink signal, demodulate the Fourier transformed uplink signal by using quadrature phase shift keying (QPSK), and acquiring UCI from the demodulated uplink signal.

17. The base station of claim 16, wherein the controller is further configured to control the transceiver to transmit, to the UE, information for a PUCCH format, the information indicating one of the first PUCCH format associated with more than one resource block or a second PUCCH format associated with one resource block.

18. The base station of claim 16, wherein the first PUCCH format is defined on one cell among a plurality of cells configured for the UE.

19. The base station of claim 16, wherein the first PUCCH format is a PUCCH format 3.

20. The base station of claim 16, wherein the UCI is modulated by using QPSK.

* * * * *